United States Patent [19]

Johnson

[11] Patent Number: 5,104,015
[45] Date of Patent: Apr. 14, 1992

[54] SPORT VEHICLE RACK AND METHOD THEREFOR

[76] Inventor: Bruce D. Johnson, 288 N. 100W 18-4, Blanding, Utah 84511

[21] Appl. No.: 531,569

[22] Filed: Jun. 1, 1990

[51] Int. Cl.⁵ .................. B62D 43/02; B60R 9/06
[52] U.S. Cl. .................. 224/42.06; 224/42.08; 224/42.21; 224/42.44
[58] Field of Search .......... 224/42.03 A, 42.04, 224/42.06, 42.07, 42.08, 42.13, 42.16, 42.21, 42.34, 42.35, 42.43, 42.44, 42.03 R, 42.15, 42.23, 42.41, 42.45 R; 297/37.2, 37.5, 37.6; 293/114; 414/463–466; 408/44; 211/149, 150

[56] References Cited

U.S. PATENT DOCUMENTS

| | | | |
|---|---|---|---|
| 1,796,580 | 3/1931 | Russell et al. | 296/37.2 X |
| 1,800,466 | 4/1931 | Miller | 224/42.44 |
| 1,977,734 | 10/1934 | Monckmeier | 224/42.08 |
| 2,674,393 | 4/1954 | Clark | 414/465 |
| 3,326,434 | 6/1967 | Cheadle | 224/42.21 |
| 3,883,018 | 5/1975 | Hoisington | 224/42.21 X |
| 4,993,610 | 2/1991 | Abretske et al. | 224/42.04 |

FOREIGN PATENT DOCUMENTS

| | | | |
|---|---|---|---|
| 75497 | 2/1953 | Denmark | 224/42.44 |
| 40962 | 6/1932 | France | 224/42.13 |

Primary Examiner—Henry J. Recla
Assistant Examiner—Robert M. Fetsuga
Attorney, Agent, or Firm—Harry M. Weiss

[57] ABSTRACT

A storage apparatus for use on the rear wall of a Multi-purpose sport vehicle. This apparatus includes a tire carrier having an L-shaped member with a vertical leg hinged in a pipe support mounted on the rear wall and with a horizontal leg supporting a pivot unit fixed to a vertical support plate having stubs supporting a tire wheel. The apparatus also includes a rack assembly having an outer tubular rack with a central space and being hinged to the rear and having an inner tubular rack hinged to an outer side tube of the outer rack and fitting into a vertical space when folded between the rear wall and the tire carrier.

8 Claims, 2 Drawing Sheets

SPORT VEHICLE RACK AND METHOD THEREFOR

BACKGROUND OF THE INVENTION

1. Field of Invention

The invention generally relates to a Multi-purpose Sport Vehicle (MPSV) rack and method therefor, and, in particular, the invention relates to a MPSV rear rack and method therefor having an outer frame and a relatively adjustable inner frame and means for moving portions of the frame.

2. Description of the Prior Art

One prior art MPSV rack is mounted on top of the MPSV or van and includes a frame having a plurality of supports connected to the top of the MPSV. Another prior art MPSV or van rack is mounted on the rear of the vehicle, however, it was difficult to get access to certain portions of the vehicle.

SUMMARY OF THE INVENTION

According to the present invention, an adjustable and foldable MPSV rear rack is provided. This MPSV rear rack comprises a tire carrier mounted on the rear portion of a MPSV and a foldable and hinged rack assembly mounted on the rear portion of the van inboard of the tire carrier.

By using the rear MPSV rack, the difficulty of loading and unloading the MPSV rack and the prior problem of gaining access to certain portions of the vehicle is minimized.

The foregoing and other objects, features and advantages will be apparent from the following description of the preferred embodiment of the invention as illustrated in the accompanying drawings.

DESCRIPTION OF THE PREFERRED EMBODIMENT

Figure 1:
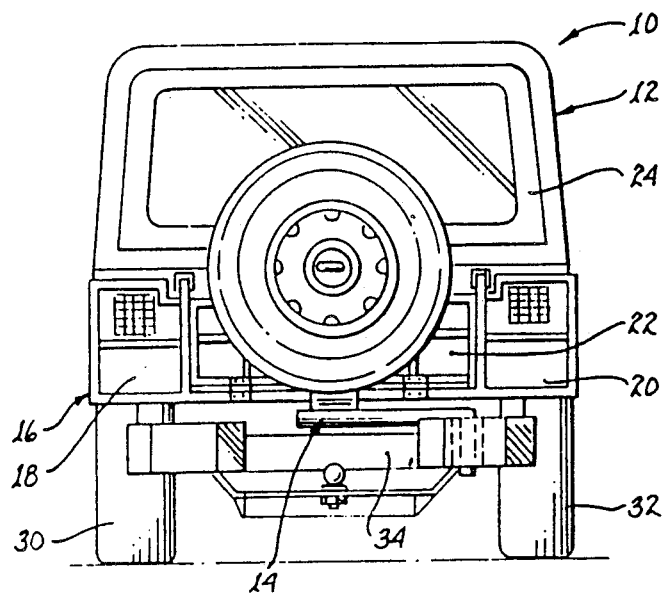
FIG. 1 is a rear elevation view of a MPSV having a MPSV rear rack according to the invention.
Figure 5:
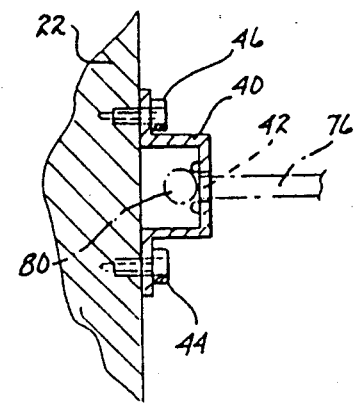
FIG. 5 is a section view as taken along the line 5—5 of FIG. 3.
Figure 2:
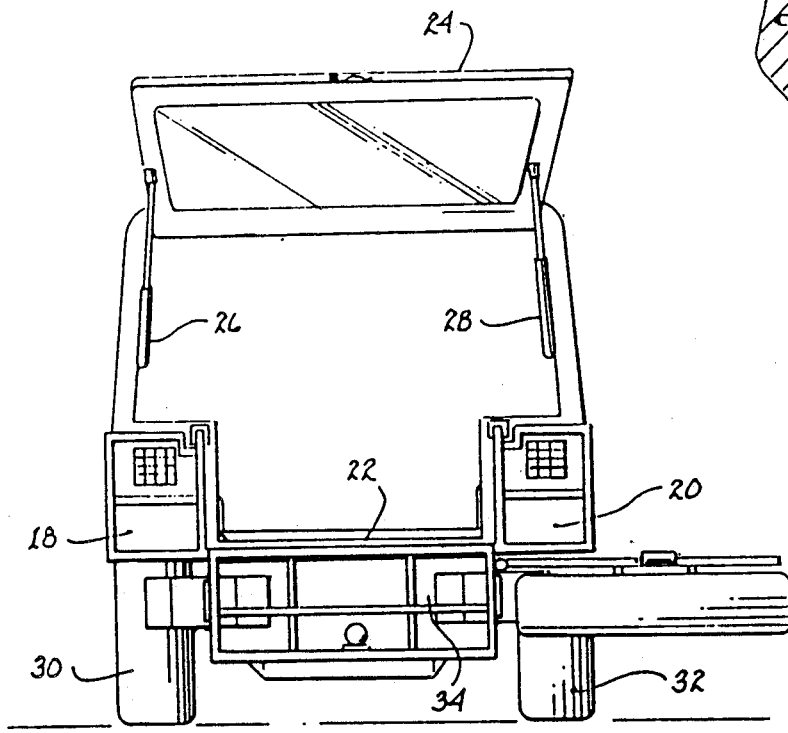
FIG. 2 is a rear elevation view corresponding to FIG. 1 and having a rear window portion in an open or raised position.
Figures 3, 4:
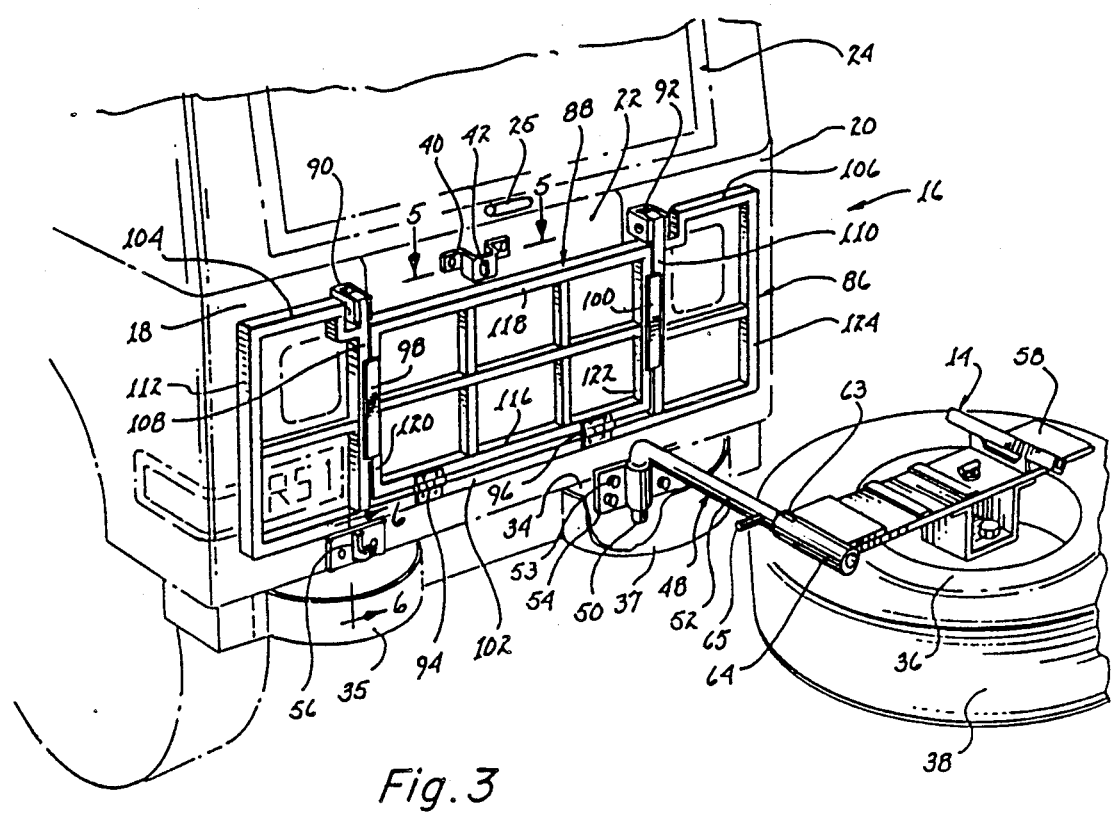
FIG. 3 is a perspective view corresponding to the view of FIG. 1 and having a tire carrier in a displaced swung out position.
FIG. 4 is a vertical section view of the rear wall of the MPSV of FIG. 1 and having the tire carrier in an inclined position and having a rack assembly in an unfolded position.

As shown in FIGS. 1, 2 and 3, a MPSV storage apparatus 10 is provided. Apparatus 10 includes a MPSV or truck or automobile 12, a rear tire carrier 14, and a rear rack or rack assembly 16. FIG. 1 shows tire carrier 14 and rack 16 in a closed position. FIG. 2 shows tire carrier 14 and rack 16 in an open position for loading or unloading van 12. FIG. 3 shows tire carrier 14 in an open position and rack 16 in a closed position during opening or closing of rack 16.

MPSV 12 has left and right rear walls 18, 20, a tailgate 22 which is bottom-hinged for opening to a horizontal position as shown in FIG. 2, and a top-hinged window 24 which has a handle 25. Window 24 has left and right telescoping struts 26, 28. MPSV 12 has front wheels (not shown) and left and right rear wheels 30, 32. MPSV 12 also has a chassis 34, which has left and right rear covers 35, 37.

Figure 6:
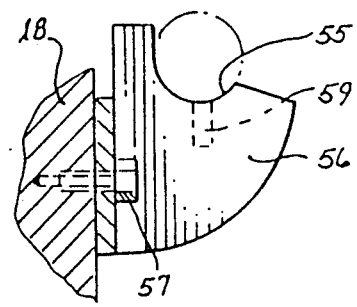
FIG. 6 is a section view as taken along the line 6—6 of FIG. 3.

As shown in FIGS. 3, 4, 5 and 6, tire carrier 14 has a closed position, an open position, and an inclined position. In the inclined position as shown in FIG. 4, tire carrier 14 connects to rack 16. Tire carrier 14 has a wheel 36 which has a spare tire 38. Tire carrier 14 has a latch plate 40 (FIG. 5), which has a slotted hole 42 and which has support bolts 44, 46 that connect to tailgate 22. Tire carrier 14 also has an L-shaped member or pivot arm 48, which has a vertical leg 50 and a horizontal leg 52. Vertical leg 50 is hinged in pipe support 54. Support 54 has a plurality of bolts 53 which connect to chassis 34. Horizontal leg 52 is supported by vertical leg 50. Horizontal leg 52 is also supported by a plate support 56 (FIG. 6). Plate support 56 has a recess or slot 55 which receives one end of leg 52. Plate support 56 also has a pair of bolts 57 which connect to wall 18, and also has a bracing bar 59.

Tire carrier 14 also has a relatively long vertical support plate 58, which is supported by pipe leg 52. Plate 58 has inner and outer sides or surfaces 60, 62. Plate 58 also has a hinge pipe 64, which has a slotted or raised end 63, and which is welded to plate 58, and which is journaled on pipe leg 52. Pipe leg 52 has a through pin 65, which coacts with end 63 for setting the inclination or tilt angle of plate 58 and pipe 64 relative to pipe 52.

Plate 58 has an angle piece 66, which is welded to plate 58, and has a channel 68, which is molded to angle piece 66. Plate 58 also has a U-shaped plate 70, which is welded to surface 62 of plate 58, and which supports tire wheel 36. Plate 70 has a plurality of bolts or studs 72, 74, which connect to and support wheel 36. Plate 70 also has a lock or latch bar 76, which latches onto latch plate 40. Bar 76 has a threaded handle 78 at one end thereof and has a welded cross bar 80 at the other end thereof for connecting into slotted hole 42. Bar 76 also has a rubber-like washer 82 and a metal washer 84.

As shown in FIGS. 3, 4, 5 and 6, rack assembly 16 has an upswing outer frame or rack 86 and has an upswing inner frame or rack 88, which is hinged to outer rack 86. Outer rack 86 has left and right hinges 90, 92, which are respectively fixedly connected to left and right walls 18, 20. Inner rack 88 also has left and right hinges 94, 96, which are fixedly connected to outer rack 86. Inner rack 88 also has left and right stop bars 98, 100, which bear on outer rack 86 when racks 86, 88 are in a horizontal position. Outer rack 86 has an outer tube 102, an inner left tube 104, an inner right tube 106, a left intermediate tube 108, a right intermediate tube 110, a left end tube 112, and a right end tube 114.

As shown in FIG. 4, outer rack 86 is swung counterclockwise to a horizontal position, and is then connected to plate 58 at channel 68. Further, intermediate right tube 110 is connected to and supported by hinge 92, which is fixedly connected to right wall 20. Inner rack 88 is swung clockwise and rests on tire 38, or alternately on plate 58 if extended. The outer tube, which is a typical tube, is preferably a one inch square metal tube. Pipe 52 is a one and one-half inch inside diameter metal pipe. Inner rack 88 has bottom and top tubes 116, 118 and has left and right end tubes 120, 122. Bottom tube 116 is fixedly connected to hinges 94, 96.

The advantages of apparatus 10 are indicated hereafter.

A) Rack assembly 16 provides relatively easy, one-hand, operation, and allows tire 38 to fold back in an out-of-the-way position, and allows easy access to tailgate 22 and window 24.

B) In one model, rack assembly 16 provides 7.5 square feet of storage space, which can be extended and enlarged to 10.5 square feet by raising hinged inner rack 88.

C) When not in use, rack assembly 16 folds against the back of MPSV 12, and tire carrier 14 has the usual offset distance from MPSV rear walls 18, 20.

D) Rack assembly 16 provides left and right seat portions when in a horizontal position.

E) Rack assembly 16 acts as a brush guard when in a folded-up vertical position.

F) Rack assembly 16 minimizes the amount of vibration, rattles and squeaks, when in a folded-up vertical position.

G) Inner rack 88 can be swung down to a vertical position, and tailgate 22 can be swung out to a horizontal position, after swinging out tire carrier 14, for easy access to the inside of van 12.

While the invention has been described in its preferred embodiment, it is to be understood that the rather than limitation and that changes may be made within the purview of the appended claims without departing from the true scope and spirit of the invention in its broader aspects.

The acronym MPSV, as used in the follow claims, is intended to cover the wide range of multi-purpose sport vehicles including JEEP's (a registered trademark of Chrysler Corporation), vans, trucks and the like.

The embodiments of an invention in which an exclusive property or right is claimed are defined as follows:

1. A rear storage apparatus for a MPSV having a rear wall and a chassis comprising:
   a tire carrier for supporting a tire wheel and tire;
   a rack assembly having an outer rack and an inner rack for supporting storage items;
   said tire carrier having an L-shaped support member having a vertical leg coupled to a pivot support adapted to be mounted on the chassis and having a horizontal leg which inserts into a pipe member pivot support fixedly connected to a tire wheel support plate;
   said pivot support having a vertical pivot axis; said pipe member pivot support having a horizontal pivot axis;
   said outer rack having a hinge adapted to be coupled to said rear wall; and
   said inner rack being coupled by a hinge to said outer rack; and
   wherein said tire wheel support plate has an outer surface with a plurality of bolts for supporting the tire wheel;
   wherein said tire wheel support plate has a latch rod extending therethrough having a latch portion for latching to a latch plate mounted on said rear wall and a threaded portion which couples to a handle for tightening said tire carrier assembly in a secure vertical position; and
   wherein said pipe member pivot support pivots around said horizontal pivot axis on said horizontal leg for allowing an inclination angle of said tire wheel support plate; and
   wherein said vertical leg of said L-shaped support member pivots on said pivot support for allowing said tire carrier to rotate around said vertical axis away from said rear wall.

2. The apparatus of claim 1, wherein
   said outer rack hinge swings the outer rack up to a horizontal position; and
   said inner rack hinge swings the inner rack up and out to an inclined position.

3. The apparatus of claim 2 wherein
   said outer and inner racks each is a metal frame having at least two side members and two end members;
   said outer rack having a central space which receives the inner rack forming a common flush top surface when the inner rack is swung into said central space of said outer rack and aligned therewith.

4. The apparatus of claim 3, wherein
   said outer rack has a pair of inner side members respectively having first and second hinges adapted to be mounted on the rear wall;
   said inner rack has a bottom member having first and second hinges mounted on an outer side member of the outer rack; and
   said inner rack has first and second end members respectively having first and second stop members for aligning the inner rack to the outer rack along the common flush top surface thereof when the inner rack is swung into said central space of said outer rack.

5. The apparatus of claim 4, wherein
   said side members and end members of the outer rack and inner rack are square tubular members having rigid joints.

6. A rack assembly for a rear wall of a MPSV which has a rear tire carrier comprising:
   a rear tire carrier adapted to be coupled to said rear wall;
   an outer rack having first hinge means adapted to be mounted on the rear wall;
   an inner rack having second hinge means mounted on the outer rack; support means between said outer rack and said rear tire carrier for supporting said outer rack when pivoted on said first hinge horizontal carrying position between said rear wall and said rear tire carrier;
   wherein said outer rack and said inner rack each is a metal frame having at least two side members and two end members; and said outer rack has a central space which receives the inner rack when folded.

7. The rack assembly of claim 6, wherein
   said outer rack has a pair of inner side members and said first hinge means including a pair of respective hinges mounted thereon;
   said inner rack has a bottom side member having a pair of hinges mounted on an outer side member of the outer rack;
   said inner rack having first and second end members respectively having first and second stop members; and
   said side members and end members are tubular members having welded joints.

8. A mobile carrying apparatus comprising:
   a MPSV having a rear wall with a tailgate and window and a chassis;
   a rear tire carrier totally supported by a pivot arm housed in a pivot support mounted to said chassis;
   a rear outer rack hinged to the rear wall; and
   a rear inner wall hinged to the rear outer rack;
   said outer rack having a control space for receiving the inner rack when folded;
   said pivot arm acting to position the rear tire carrier adjacent to and parallel to the rear wall whereby;
   said outer and inner racks when folded vertically against the rear wall are disposed between the rear tire carrier and the rear wall.

* * * * *